O. ETNIER.
Cultivator.
No. 64,086.     Patented Apr. 23, 1867.
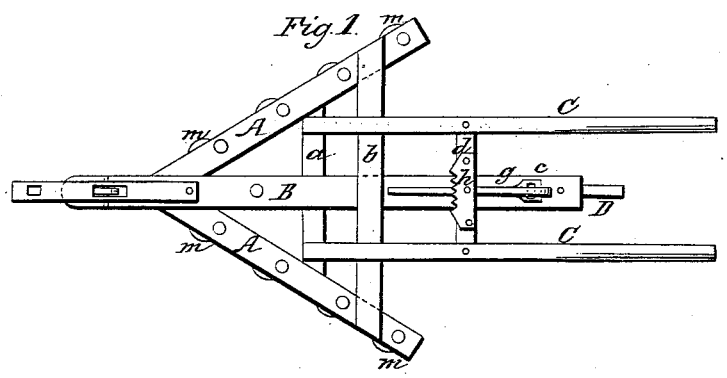
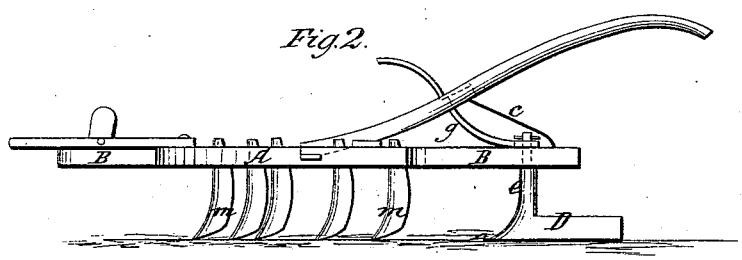

United States Patent Office.

OLIVER ETNIER, OF MOUNT UNION, PENNSYLVANIA.

Letters Patent No. 64,086, dated April 23, 1867.

IMPROVEMENT IN CULTIVATORS.

*The Schedule referred to in these Letters Patent and making part of the same.*

TO ALL WHOM IT MAY CONCERN:

Be it known that I, OLIVER ETNIER, of Mount Union, in the county of Huntingdon, and State of Pennsylvania, have invented a new and useful Improvement in Cultivator; and I do hereby declare that the following is a a full, clear, and exact description thereof, which will enable others skilled in the art to make and use the same, reference being had to the accompanying drawings, forming part of this specification, in which—

Figure 1 is a top view of my improved cultivator.

Figure 2 is a side view.

Similar letters of reference indicate like parts.

This invention relates to an improvement in cultivators and harrows, and consists in attaching an adjustable guide-blade or rudder to the rear end of the centre beam for steering or controlling the movement of the cultivator, so that it shall run straight on hill-sides, whereby the team can travel on a level instead of going up and down hill as usual. It also steadies the machine, and regulates the movement on level ground.

A A are the side-beams of a V frame, and B is a centre-beam extending back beyond the ends of the side-beams, to which are attached shovels, $m\ m$, to serve as a cultivator, or teeth, to serve as a harrow, arranged in the usual way. The handles C C are secured at their front ends to the cross-beams $a$ and $b$ in such manner as to have the proper elevation above the centre-beam, to which they are connected by a brace, $c$, fastened to a cross-bar, $d$. To the rear end of the centre-beam B is pivoted a long vertical guide-plate or rudder, D, which is pointed in front to enter the ground easily, and may be set to any required depth for holding well. The rudder-stem $e$ passes up through the centre-beam, and on the upper side of the beam is connected with a lever, $g$, which moves and turns the rudder as desired, and is held in place by a rack, $h$, in the cross-bar $d$. It will be readily understood that when the cultivator is at work the rudder or guide-blade D will penetrate the ground, and, by the length of its bearing on the earth on both sides of the plate, will govern and control the movement of the machine just as it may be set by connecting the lever or handle $g$ to the rack $h$; and while it will give steadiness to the movement on level ground, it will also keep the cultivator in its place to travel horizontally on a hill-side.

Having described my invention, I claim as new, and desire to secure by Letters Patent—

The combination of the guide-blade or rudder D, placed on the rear of the projecting centre-beam B, and the handles C C, attached to the cross-beams $a\ b$, arranged and operating substantially as and for the purposes herein described.

OLIVER ETNIER.

Witnesses:
 GEO. MCLAUGHLIN,
 BENJAMIN F. DOUGLAS.